April 11, 1961 C. H. WIKLUND 2,978,823
SLIDE CHANGER
Filed May 28, 1958 6 Sheets-Sheet 1
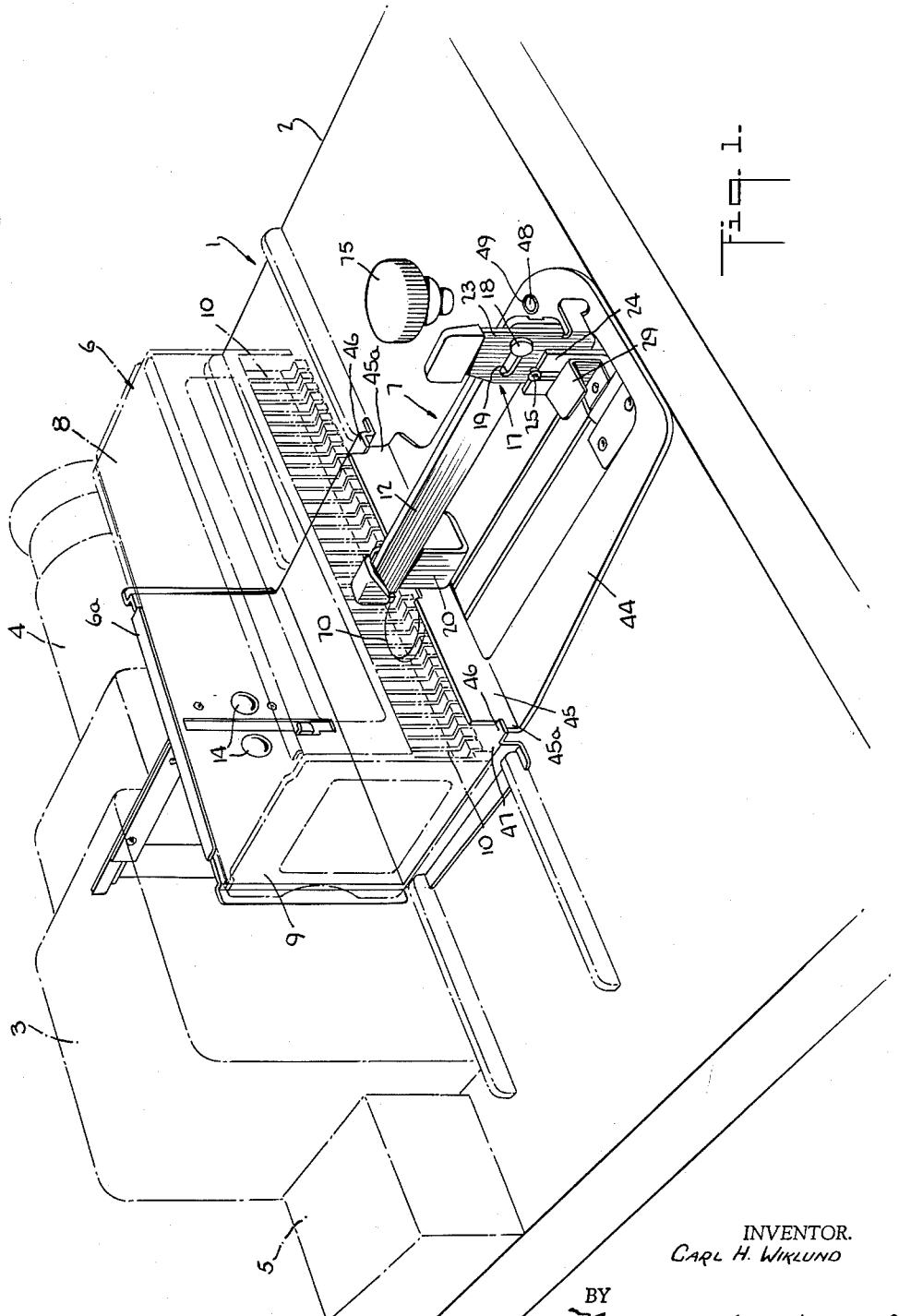
INVENTOR.
CARL H. WIKLUND
BY
Norman R Holland
ATTORNEY

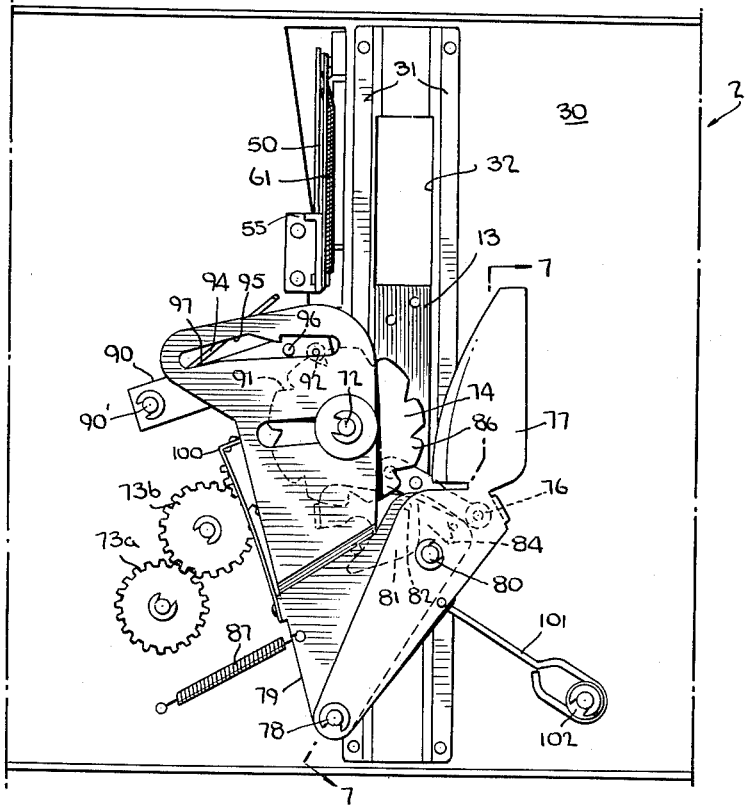

INVENTOR.
CARL H. WIKLUND
BY Norman H. Holland
ATTORNEY

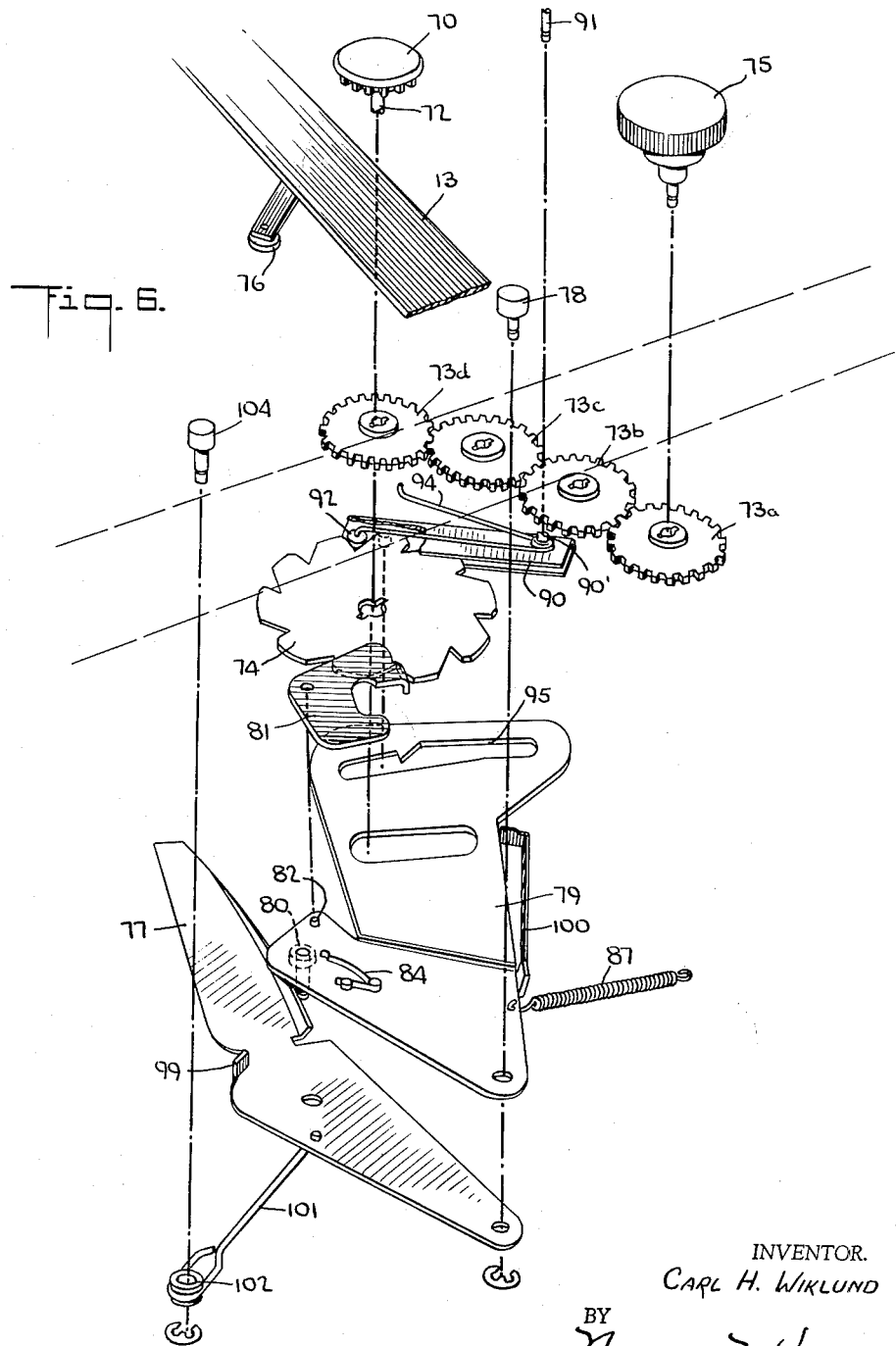

April 11, 1961 C. H. WIKLUND 2,978,823
SLIDE CHANGER
Filed May 28, 1958 6 Sheets-Sheet 5
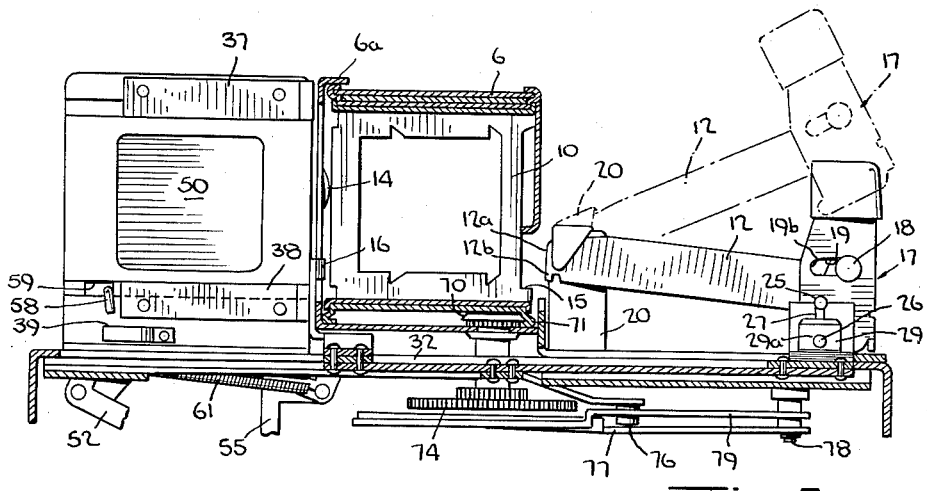
Fig. 9.
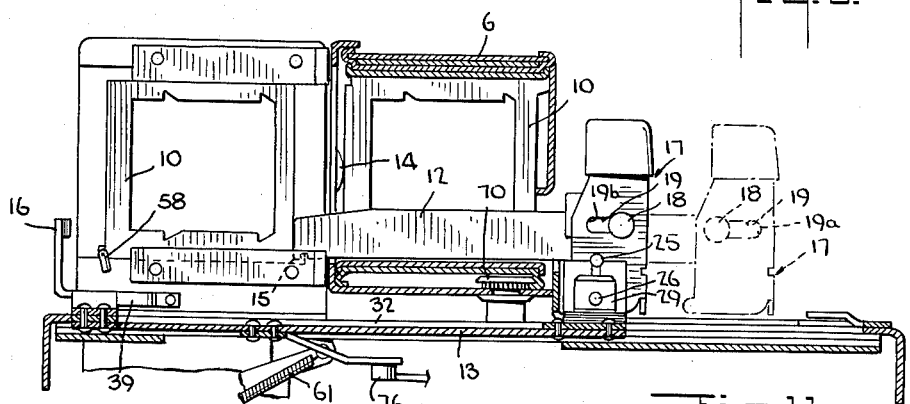
Fig. 11.
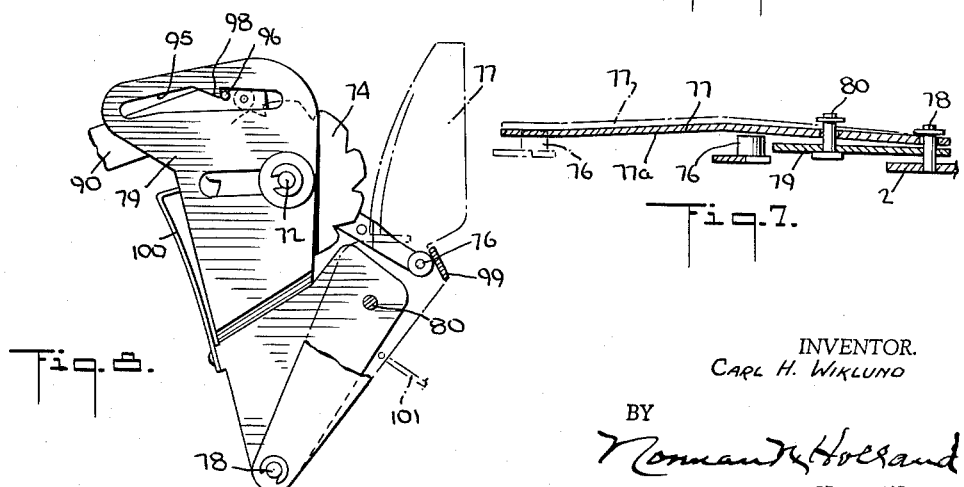
Fig. 8.
Fig. 7.
INVENTOR.
CARL H. WIKLUND
BY
Norman K. Holland
ATTORNEY April 11, 1961  C. H. WIKLUND  2,978,823
SLIDE CHANGER
Filed May 28, 1958  6 Sheets-Sheet 6
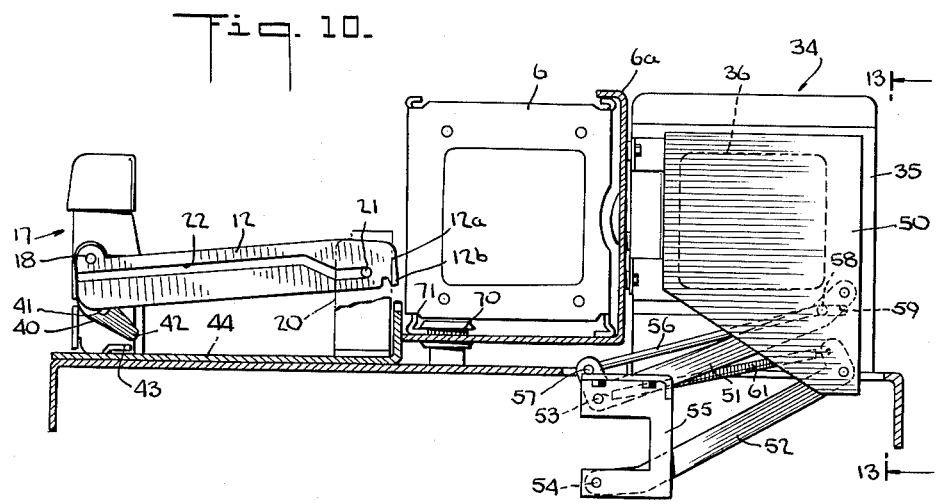
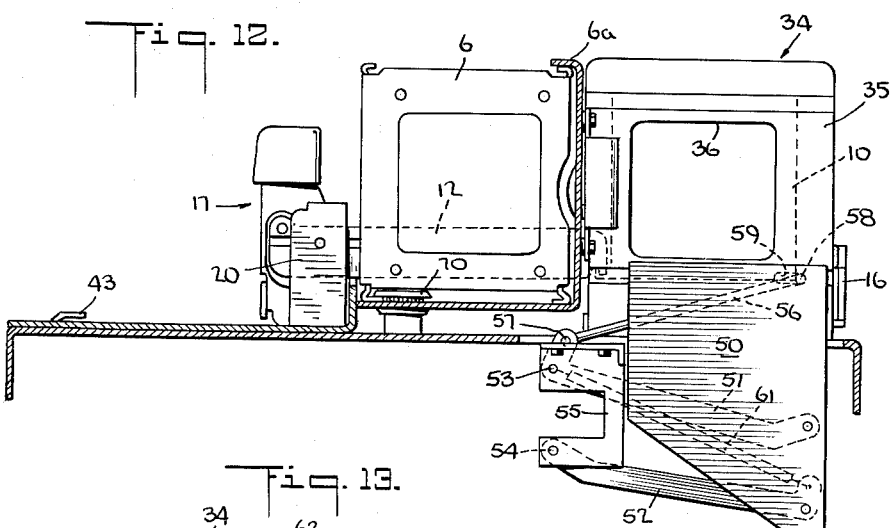
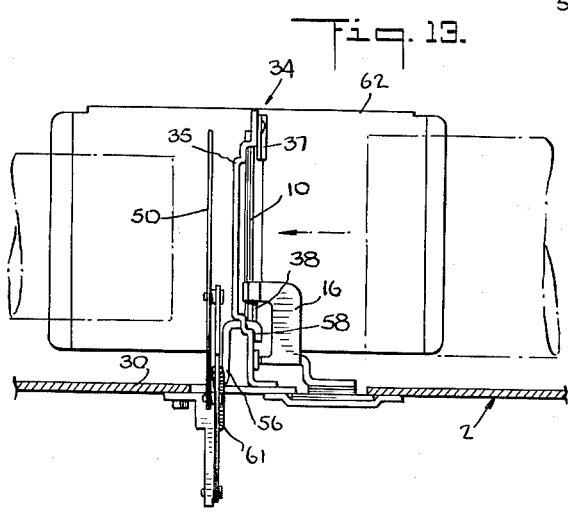
INVENTOR.
CARL H. WIKLUND
BY
Norman R. Holland
ATTORNEY

United States Patent Office 2,978,823
Patented Apr. 11, 1961

2,978,823
SLIDE CHANGER

Carl H. Wiklund, New Rochelle, N.Y., assignor to Aire-quipt Manufacturing Co., Inc., New Rochelle, N.Y., a corporation of New York Filed May 28, 1958, Ser. No. 738,364

8 Claims. (Cl. 40—79)

The present invention relates to a slide changing device for photographic slides and more particularly to an improved magazine indexing and advancing device for incorporation in an automatic or a semiautomatic magazine-type slide projector.

The constantly increasing popularity of transparent photographic slides which are adapted for projection and the increasing number of these slides which are owned and exhibited by photographers requires efficient, rugged, and trouble-free slide changing means which are adapted for use by persons of widely varying skills and experience. A slide changing mechanism is required which provides a convenient storage means for large numbers of slides and which allows the slides to be selected and exhibited relatively rapidly many times over without damage or wear to the slides themselves which become highly prized by the owners. The longer the slides are retained and the more often they are exhibited, the higher their value to their owner tends to become and it is therefore important that automatic and semiautomatic slide changing apparatus handle these slides without any danger of wear or other disfiguration of the slides.

A particularly important feature in each of the semi-automatic or automatic slide changers is the magazine indexing mechanism which advances the slide holding magazines to present successive slides to the viewing position. Indexing mechanisms which lack the desired degree of positive control necessary to insure the exact co-operation of the slide changing lever with the stored slides may allow the slide positioning means to engage the slides off-center so that the slides are jammed in the mechanism or are scarred or otherwise disfigured.

Accordingly, an object of the present invention is to provide an improved slide changer.

Another object of the present invention is to provide an improved automatic or semiautomatic magazine indexing means for a slide changer.

Another object of the present invention is to provide a magazine indexing device which is rugged and positive in its action.

Another object of the present invention is to provide an indexing device which prevents the removal of a slide from a magazine where the magazine is incorrectly indexed.

Another object of the present invention is to provide an indexing device having a positive and smooth indexing action.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a perspective view of a slide changer according to the present invention;

Figs. 2–5 are bottom plan views of the indexing portion of the slide changer of the present invention showing the relative positions of the members of the indexing portion at successive phases of a slide changing cycle;

Fig. 6 is an exploded perspective view of the indexing portion;

Fig. 7 is a sectional view along line 7—7 of Fig. 2;

Fig. 8 is a fragmentary view of the indexing portion showing diagrammatically the slide transfer blocking action when the magazine is incorrectly indexed;

Fig. 9 is a vertical sectional view of the slide changer corresponding to the changer position of Fig. 2 taken from the left-hand end of Fig. 1;

Fig. 10 is a vertical sectional view corresponding to Fig. 9 taken from the right-hand end of Fig. 1;

Fig. 11 is a vertical sectional view of the slide changer corresponding to the changer position of Fig. 3 taken from the left-hand end of Fig. 1;

Fig. 12 is a vertical sectional view corresponding to Fig. 11 taken from the right-hand end of Fig. 1; and Fig. 13 is a vertical sectional view taken along line 13—13 of Fig. 10.

Figure 4:
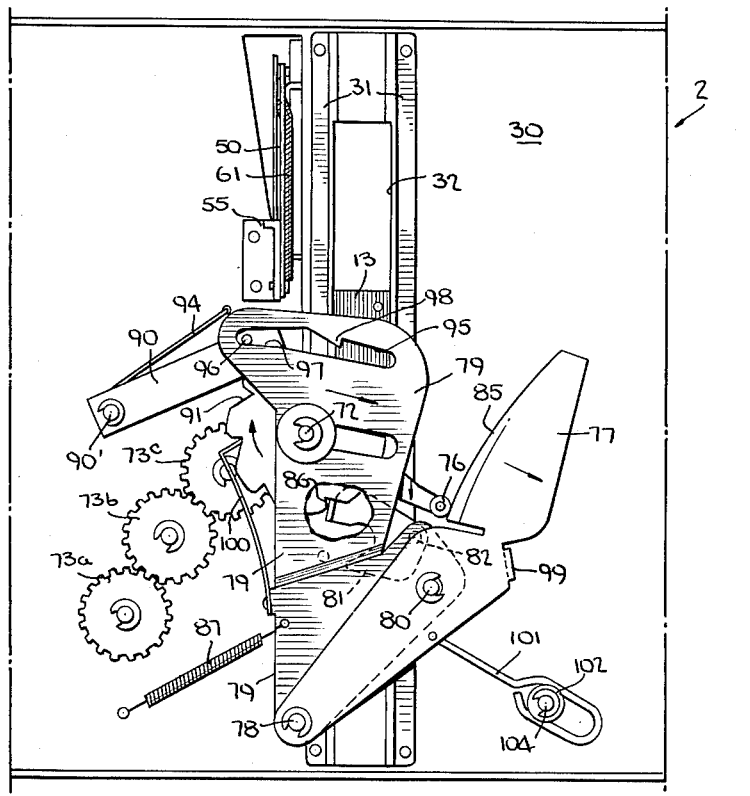

The slide changer will first be described with particular reference to Fig. 1. The changer 1 includes a base 2 suitable for the addition of a suitable lamp and reflector unit 3, lens unit 4, and a blower motor 5. The lamp and reflector unit 3, lens unit 4, and the blower motor 5 form no part of the present invention and are shown in Fig. 1 to illustrate the relation of the slide changer 1 to a typical slide projector unit. Slide changer 1 is adapted to mount a slide holding magazine 6 in slidable relationship to the lamp and reflector unit 3 and the lens unit 4 adjacent a magazine guide plate 6a. A slide injection mechanism indicated generally at 7 is adapted to sequentially move slides from the magazine 6 to a viewing position in conjunction with the lamp and reflector unit 3 and the lens unit 4.

The magazine 6 comprises longitudinal walls 8 and end walls 9 and has a plurality of vertical partitions adapted to mount slide frames 10 therebetween. The magazine 6 per se comprises no part of the present invention and may be a magazine such as is disclosed in my prior Patent No. 2,711,602, which issued on June 28, 1955.

The slide injection mechanism 7 and its cooperating and interconnected magazine indexing portion will now be described in detail.

As illustrated in Figs. 10–13, the slide frames 10 are moved to and from the magazine 6 by the operation of the injection lever 12 and the pusher arm 16 on slide lever 13. The end 12a on the injection lever 12 is guided into position on the slide frame 10 by the engagement of the hook 12b on the injection lever 12 with the recess 15 of the slide frame 10. The injection lever 12 then moves the slide frame 10 to the viewing position as illustrated in Figs. 11 and 12. The pusher arm 16 mounted on the opposite end of the slide lever 13 is adapted to engage the rear of slide frame 10 to return slide frame 10 to the magazine 6 when the injection lever 12 is withdrawn from the magazine 6.

As seen in Fig. 9, the injection lever 12 is connected to the slide lever 13 by means of the slide lever handle 17. The injection lever 12 is pivotally connected to the handle 17 by the pin 18 which is slidably fitted in the slot 19 in the handle 17. The inner end of the injection lever 12 is slidably fitted in an injection lever guide 20. A cam pin 21 in lever guide 20 engages a cam slot 22 in the injection lever 12 which is suitably shaped as seen in Fig. 10 to lower the hook 12b of the injection lever 12 into the recess 15 of the slide frame 10 on the inward motion of handle 17 when the slide frame 10 is being moved into the viewing position and to lift the hook 12b from the recess 15 when the slide frame 10 is being moved from the viewing position by the pusher arm 16 towards its storage position in the magazine 6 as seen in Fig. 9. The final positioning of the slide frame 10 within the magazine 6 is done by cam surfaces 14 on the magazine guide plate 6a (Figs. 1 and 9) as the magazine 6 is indexed along the guide plate 6a.

The slide lever 13 is slidably mounted on the underside of the top 30 (Fig. 2) of the base 2 within slotted channel members 31 which form a track for the slide lever 13. An elongated slot 32 in the top plate 30 is provided for the slide lever handle 17 and for the pusher arm 16 mounted on the opposite ends of the slide lever 13.

In order to provide for the final withdrawal movement for the injection lever 12 from magazine 6 independently of the movement of pusher arm 16, a cam 40 is provided on handle 17 as is illustrated in Figs. 10 and 12. As seen in Fig. 10, the cam 40 is pivotally connected between injection lever 12 and the handle 17 by pin 18. The cam 40 is also pivotally attached to the gripping portion of the slide lever handle 17 by pin 41. As the injection lever 12 is withdrawn from the magazine 6, the pin 18 first slides to the inner end 19b of slot 19 (Fig. 11) until the lower edge 42 of the cam 40 strikes a projection 43 on the guide plate 44 (Fig. 10). This moves the upper edge of the cam 40 to the extreme outer edge 19a of the slot 19, thereby causing the injection lever 12 to move more rapidly than the slide lever 13 and its interconnected pusher arm 16. During the final portion of the injection lever motion, the cam slot 22 in the injection lever 12 raises the injection lever 12 clear of the recess 15 in the slide frame 10, allowing the injection lever to be drawn outwardly from the slide frame 10 and clear of the magazine 6 by the motion of cam 40.

In the event that the operator improperly fits the magazine 6 into position or where damaged slide frames 10 are inadvertently used in the magazine 6, the mechanism of the slide changer may jam with the slide injection lever 12 in its inserted position within the magazine 6. In this case it is sometimes desirable to move the slide injection lever 12 independently of the slide lever 13 and to withdraw it from the magazine 6 in a disconnected manner as is illustrated in dash-dot lines in Fig. 9. To facilitate this operation, the injection lever handle 17 is detachably connected to the slide lever 13 by being formed in two separable portions. As seen in Fig. 1, the injection lever handle 17 has a gripping portion 23 which is slidably connected to the injection lever 12 by the pin 18 in slot 19. The gripping portion 23 is detachably connected to a slide lever portion 24 by pins 25 and 26 (Fig. 9) which engage the slot 27 in the slide lever 24 of the handle 17. A spring 29 has an aperture 29a which releasably engages the lower pin 26 to hold the gripping portion 23 in its connected position. When it is desired to disconnect the slide injection lever 12 from the slide lever 13, the spring 29 is moved outwardly to release the lower pin 26, allowing the slide lever portion 24 to be moved upwardly from slot 27.

The injection lever guide 20 is preferably mounted on the guide plate 44 and the entire guide plate 44 is removably positioned on the top 30 of base 2 so that the injection lever guide 20 may be removed from the base 2 (Fig. 9) when it is desired to release the injection lever 12 from the slide lever 13. As seen in Fig. 1, guide plate 44 has a vertical flange 45 whose opposite ends 45a fit beneath projections 46 on the horizontal magazine support plate 47. The outer end of the guide plate 44 is positioned by a suitable pin 48 which fits into slot 49 in the guide plate 44. The injection lever 12, therefore, may be completely removed from the slide projector by removing the gripping portion 23 of the slide lever handle 17 from the slide lever 13 and by thereafter lifting the guide plate 44 clear of the base 2. This permits the clearance of any possible jamming conditions whether the injection lever 12 is inserted into or withdrawn from the magazine 6.

Positioning frame 34, which holds the slide frame 10 in position for viewing, is illustrated in Figs. 9–12. The slide frame positioner 34 comprises a framelike face plate 35 which is attached to the magazine guide plate 6a (Fig. 10) and positioned on the top plate 30 of the base 2 and which has a suitable aperture 36 to frame the transparent slide. Channel members 37 and 38 are attached to the upper and lower portions, respectively, of the slide frame positioner 34 to receive the upper and lower edges of the slide frame 10 after it has been moved into the viewing position by the injection lever 12.

In order to cut off the projection beam during the interval while the slide frames 10 are changed, a shutter means is provided as illustrated in Figs. 10, 12, and 13. The shutter means comprises a shutter plate 50 which is mounted on generally parallel shutter arms 51 and 52. One end of each of these arms is pivotally attached to the shutter plate 50 and the opposite ends are pivotally attached at spaced pivot points 53 and 54 on the shutter bracket 55. The shutter is moved from its closed position as illustrated in Figs. 10 and 13 to its open position as illustrated in Fig. 12 by the shutter rod 56. The lower end of the shutter rod 56 is pivotally attached to the upper shutter arm 51 as indicated at 57 and the opposite or upper end of the shutter rod 56 has a hook portion 58 which is positioned in a slot 59 in the slide frame positioner 34. Slot 59 is adjacent the outer end of the lower slide frame channel 38 so that hook portion 58 is engaged by the edge of the slide frame 10 when the slide frame 10 is moved into the viewing position, causing the hook 58 to be moved from its inward position as seen in Figs. 10 and 13 to its outer position as illustrated in Figs. 11 and 12. This motion of the shutter rod 56 rotates the shutter arms 51 and 52 about their pivot points 53 and 54, respectively, against the force of the spring 61, thereby causing the shutter plate 50 to move clear of the aperture 36 to its lowered position as illustrated in Fig. 12. The shutter 50 is therefore moved away from the aperture 36 when the slide frame is moved nearly completely into the viewing position by the injection lever 12 since the slide frame 10 does not contact the shutter actuating rod 56 until its outer edge reaches the inner edge of the slot 59. As seen in Figs. 9 and 11, a spring clip 39 is mounted on the bottom of the slide frame positioner 34 in such a position that it releasably engages the pusher arm 16 when the pusher arm 16 has been moved to the viewing position to hold the slide frame 10 in a steady viewing position against the force of shutter spring 61.

The indexing portion is shown in Figs. 2–5. The connection between the indexing portion and the magazine 6 is made through the indexing gear 70 (Figs. 1 and 9), which engages an elongated rack 71 mounted on the bottom of the magazine 6. The indexing gear 70 is connected by shaft 72 to the detent wheel 74 on the lower end of the shaft 72, which is also coupled to the indexing knob 75 by the gear train 73a—73d. The indexing knob 75 is used to position the magazine 6 independently of the slide injection mechanism 7 so that the magazine 6 may be positioned for the showing of any particular slide frame 10 and also so that certain slide frames 10 may be skipped as desired.

The indexing portion indexes the magazine 6 automatically to advance the magazine 6 each time that the injection lever 12 is operated. A cycle of the indexing portion is illustrated in Figs. 2–5. In Fig. 2 the injection lever 12 is in its withdrawn position clear of the magazine 6 and the interconnected slide lever 13 is also at its extreme withdrawn position. An actuator roller 76 is fixedly attached to the lower surface of the slide lever 13 in position to engage an actuator 77, which is pivotally mounted by pin 78 on the bottom of the changer base 2. A pawl lever 79 is also pivotally mounted on the pin 78, and it is attached to the actuator 77 by a pin member 80. A pawl 81 is pivotally attached at 82 to the pawl lever 79 so that it is urged against the detent wheel 74 by a spring 84.

As seen in Fig. 7, the actuator roller 76 engages the upper surface 77a of the actuator 77 as the slide lever 13 is moved inwardly by the injection lever 12 during the insertion of a slide frame 10 into the viewing position. Actuator 77 is loosely mounted on the pin 78 to permit it to swing downwardly clear of the actuator roller 76 during this motion. Thus, as the injection lever 12 is moved to its inward position corresponding to Figs. 3, 11 and 12 when a slide frame 10 is in the viewing position, no motion is imparted to the detent wheel 74. When the injection lever 12 is withdrawn from the magazine to carry a slide frame 10 back to the magazine 6 from the viewing position, the actuator roller 76 engages the cam surface 85 of the actuator 77, causing it to swing clockwise as seen in Fig. 4 and also causing the connected pawl lever 79 to similarly move in a clockwise direction. Pawl 81 rides over the surface of the teeth 86 of detent wheel 74 until the actuator 77 reaches its extreme clockwise position as seen in Fig. 4. Further withdrawal of the injection lever 12 from this point causes the actuator roller 76 to clear the cam surface 85, thereby releasing the actuator 77 and its interconnected pawl 81 for counterclockwise rotation under the force of the spring 87, which has been stretched during the clockwise motion of the actuator 77. The pawl 81 now engages the teeth 86 of detent wheel 74, causing it to move in a clockwise direction a distance corresponding to the width of one ratchet tooth 86. This rotates the shaft 72 and its interconnected indexing gear 70 on the upper surface of the base 2 and the magazine 6 is stepped to present the next successive slide frame 10 to the slide injection position with respect to the slide injection lever 12.

In order to provide a positive indexing of magazine 6 at the exact position for the proper insertion of the slide frame 10, a pivotally mounted detent lever 90 is provided to engage detents 91 between successive teeth 86. Detent lever 90 is pivotally mounted at pinion 90' on the lower surface of the base 2, and a detent engaging wheel 92 is mounted thereon to engage the detents 91 on the detent wheel 74 under the force of spring 94.

An indexing control slot 95 is provided in the outer portion of the pawl lever 79 to control the operation of the detent lever 90 to disengage it during the initial portion of the indexing of the detent wheel 74 by the pawl 81 and to prevent skipping of the detent 91 at the end of each indexing cycle.

These control features are provided in the following way. A control pin 96 extends downwardly from the detent lever 90 and through the control slot 95. When the pawl lever 79 has been moved to its furthermost clockwise or cocking position as seen in Fig. 4, a lifting surface 97 on the control slot 95 engages the control pin 96 to lift the detent engaging wheel 92 from between the detent 91 of detent wheel 74. This permits a relatively free movement of the detent wheel 74 at the start of the indexing operation.

Figure 5:
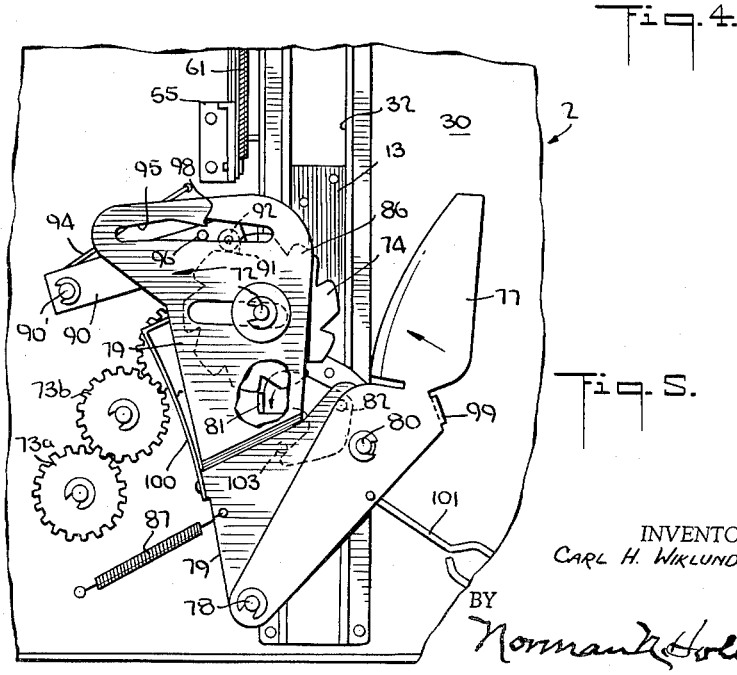

Due to the high rotational velocity of detent wheel 74 required for an efficient indexing operation and while the pawl 81 is rotating the detent wheel 74 in a clockwise direction, the detent engaging wheel 92 may be thrown or bounced outwardly and clear of the detent wheel teeth 86 so that a notch would be skipped, causing a slide to be missed. In order to prevent this, a locking projection 98 is formed in the control slot 95. As illustrated in Fig. 5, the locking projection 98 is positioned to engage the control pin 96 on the detent lever 90 as the detent engaging wheel 92 enters the detent 91.

The locking projection 98, therefore, prevents the outward motion of the detent lever 90 at this point to prevent its jumping to the next detent 91 and keeps the detent engaging wheel 92 in contact with the detent wheel 74 so that the detent engaging wheel 92 comes to rest squarely in the proper detent 91. In order to prevent additional rotation of the detent wheel 74, the pawl 81 is lifted out of engagement with the detent wheel tooth 86 by a lift pin 103 mounted on the bottom of the base 2 at the same point that the detent engaging wheel 92 enters notch 91. This lifting of the pawl 81 also frees the detent wheel for movement in either direction by the indexing knob 75. As seen in Fig. 2, the final counterclockwise movement of the pawl lever 79 from its intermediate position as illustrated in Fig. 5 to its final position as illustrated in Fig. 2 moves the locking projection 98 clear of the control pin 96 so that the detent wheel 74 may be stepped by the indexing knob 75 without interference from the locking projection 98.

The locking projection 98 also prevents the operation of the slide transfer mechanism when the detent wheel 74 is not indexed properly. When the detent wheel 74 is not properly indexed, the detent engaging wheel 92 and the detent lever 90 will be swung outwardly on the detent wheel 74 as seen in Fig. 8. This will cause the control pin 96 to move outwardly adjacent to the locking projection 98 so that clockwise motion of the pawl lever 79 is prevented. The prevention of clockwise motion of the pawl lever 79 prevents movement of the slide lever 13 as the actuator roller 76 is positioned behind a locking tab 99 on the actuator 77. A slight clockwise rotation of the interconnected actuator 77 and the pawl lever 79 is required so that the actuator roller 76 may clear the locking tab 99. When the detent wheel 74 is not properly indexed and the control pin 96 is positioned adjacent the locking projection 98 as seen in Fig. 8, this rotation is prevented so that the actuator roller 76 strikes the locking tab 99, thereby effectively preventing the insertion of a slide frame 10 until the indexing is corrected by a slight adjustment on the indexing knob 75.

In order to prevent random motion of the detent wheel 74 when the detent lever 90 is in its disengaged position just prior to the indexing motion and as shown in Fig. 4, an auxiliary detent lever 100 is mounted on pawl lever 79 to lightly engage the detent wheel 74 and to hold it in place until it is engaged by the pawl 81. As illustrated in Fig. 5, the auxiliary detent lever 100 is lifted clear of the detent wheel 74 by the pawl lever 79 during the indexing action.

In order to provide for a quiet and smooth indexing movement of the interconnected pawl lever 79 and the actuator 77, a noise damping device is preferably provided which comprises a damping arm 101 slidably mounted about a damping cushion 102 on pinion 104 so that the cushion resiliently engages the damping arm 101 during the terminal portion of the indexing action.

Operation

The operation of the changer which has been set forth in detail above in connection with a description of the changer mechanism will now be summarized.

In order to project a series of slide frames 10 contained in a magazine 6, the magazine 6 is first slipped into place on support plate 47 adjacent the magazine guide plate 6a until rack 71 of magazine 6 contacts indexing gear 70, indexing knob 75 is then rotated clockwise 2 audible clicks thereby positioning the first slide frame 10 opposite the injection lever 12. The slide frames 10 are now ready to be moved in sequence to the positioning frame 34 for viewing by the intermittent reciprocation of the injection lever 12 by the operator.

In order to move each slide frame 10 to the positioning frame, the operator moves the injection lever 12 inwardly of the magazine 6 by means of the injection lever handle 17. At the first portion of the inward movement of the injection lever 12, the end 12a on the injection lever 12 engages the side of the slide frame 10 and the hook 12b of the injection lever 12 is moved downwardly by the cooperating pin 21 and the cam slot 22 (Fig. 10) to engage the recess 15 in the slide frame 10. In the preferred embodiment illustrated, the slide frames 10 include a frame having the recess 15. The magazine 6 may also be used with slide frames having only the conventional cardboard frame, and in this case the slide frame is moved into position by the end 12a of the injection lever 12. Additional movement of the injection lever 12 moves the slide frame 10 into the positioning frame 34. As the slide frame 10 reaches its final position in the positioning frame 34, the edge of the slide frame 10 engages the hook portion 58 of the shutter rod 56 so that the shutter plate 50 is swung clear of the aperture 36, thus exposing the transparent portion of the slide frame 10 to the optical system of the slide projector.

To withdraw slide frame 10 from the viewing position, the injection lever 12 is withdrawn from the magazine 6. This permits the shutter 50 to return to its aperture blocking position under the influence of the spring 61. When the injection lever 12 has nearly reached its outermost position, the cam slot 22 lifts the injection lever hook 12b from the slide frame recess 15. The outward motion of the slide frame 10 to the magazine is controlled by the pusher arm 16 which is connected to the injection lever 12 by means of the interconnected slide lever 13. As more fully described above, the pivoted cam 40 on the slide lever handle 17 engages the projection 43 on the edge of the guide plate 44 to swing the injection lever 12 outwardly of the magazine 6 independently of the pusher arm 16 and the slide frame 10 at the end of the outward stroke. This permits the subsequent indexing of the magazine 6 without interference from the injection lever 12. The automatic indexing of the magazine 6 during the above-described movement of the slide lever 12 will now be described.

As illustrated in Figs. 2–5, the inward motion of the injection lever 12 to move a slide frame into the viewing position does not operate the indexing mechanism as the actuator roller 76 on the slide lever 13 slides inwardly across the top of the actuator 77 as the actuator 77 pivots downwardly away from the actuator roller 76 (Fig. 7). On the return movement of the injection lever 12, however, actuator roller 76 engages the cam surface 85 of the actuator 77 causing it and connected pawl lever 79 to swing clockwise as seen in Fig. 4.

Pawl 81 rides over the surface of the teeth 86 of detent wheel 74 until the actuator 77 reaches its extreme clockwise position as seen in Fig. 4. Further withdrawal of the injection lever 12 from this point causes the actuator roller 76 to clear the cam surface 85, thereby releasing actuator 77 and its interconnected pawl 81 for counterclockwise rotation under the force of the spring 87, which has been stretched during the clockwise motion of the actuator 77. The pawl 81 now engages the teeth 86 of detent wheel 74, causing it to move in a clockwise direction to rotate the shaft 72 and its interconnected indexing gear 70 on the upper surface of the base 2. The magazine 6 is moved along support plate 47 to present the next successive slide frame 10 to its slide injection position with respect to the slide injection lever 12.

The detent engaging wheel 92 of detent lever 90 now engages a detent 91 on the detent wheel 74 under the force of spring 94 to correctly index the detent wheel 74 and the interconnected magazine 6.

When the pawl lever 79 has been moved to its furthermost clockwise or cocking position as seen in Fig. 4 during the indexing action, the lifting surface 97 in the control slot 95 engages the control pin 96 to lift the notch engaging wheel 92 from the detent 91 of detent wheel 74. This permits a relatively free movement of the detent wheel 74 at the start of the indexing operation.

During the rotation of the detent wheel 74 by the pawl 81, the locking projection 98 engages the control pin 96 on the detent lever 90 just when the detent engaging wheel 92 enters the detent 91. The locking projection 98, thereby prevents the outward motion of the detent lever 90 at this point and keeps the detent engaging wheel 92 in contact with the detent wheel 74 and squarely in the detent 91. As seen in Fig. 2, the locking projection 98 clears the control pin 96 when the pawl lever 79 reaches its final clockwise position so that the detent wheel 74 may be stepped by the indexing knob 75 without interference from the locking projection 98 for adjustment of the magazine 6 independently of the use of the slide lever 12.

The locking projection 98 also prevents the operation of the slide transfer mechanism when the detent wheel 74 is not indexed properly. When the detent wheel 74 is not properly indexed, the detent engaging wheel 92 on the detent lever 90 will be swung outwardly on the detent wheel 74 as seen in Fig. 8. This causes the control pin 96 to move outwardly adjacent to the locking projection 98 so that clockwise motion of the pawl lever 79 is prevented. The prevention of clockwise motion of the pawl lever 79 prevents movement of the slide lever 13 since the actuator roller 76 is positioned behind a locking tab 99 on the actuator 77. A slight clockwise rotation of the interconnected actuator 77 and the pawl lever 79 is required so that the actuator roller 76 may clear the locking tab 99. When the detent wheel 74 is not properly indexed and the control pin 96 is positioned adjacent the locking projection 98 as seen in Fig. 8, this rotation is prevented so that the actuator roller 76 strikes the locking tab 99, thereby effectively preventing the insertion of a slide frame 10 until the indexing is corrected by a slight adjustment on the indexing knob 75.

It will be seen that an improved slide changer has been provided having an improved smoothly acting and positive indexing means which permits rapid operation of the slide injection mechanism without damage to the slide frames or to the slide frame magazine. The improved slide changer and indexing mechanism minimize the probabilities of any jamming of the apparatus and thus protect the slide frames and magazines and give them an almost indefinite life even when handled by the most inexperienced projector operator. The improved slide changer mechanism is also rugged and reliable and easily manufactured and is adaptable for use with most types of slide projectors and permits them to be adapted for use as semi-automatic magazine-type projectors.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A slide changer comprising means to move slides stored in a magazine to and from a viewing position, indexing means including a gear adapted to mesh with a rack on the magazine and operatively coupled to the first said means to advance the magazine to present successive slides to said first said means, indexing control means comprising a detent wheel connected to said gear, a detent lever positioned to engage a detent in said detent wheel to arrest the movement of said detent wheel, resilient means to urge said detent lever into the next consecutive detent on the detent wheel during the indexing of the magazine to limit the advance of the detent wheel to one detent, and auxiliary means adapted to force said detent lever into said next consecutive detent during a portion only of the indexing of the magazine comprising a cam surface having a locking projection therein, and a control pin on said detent lever positioned to engage the locking projection on the cam surface during only a portion of the indexing of the magazine whereby the locking projection moves the detent lever into said next consecutive detent during the indexing of the magazine.

2. The slide changer as claimed in claim 1 which further comprises a cam lifting surface portion on said cam surface positioned to engage said control pin to raise the detent lever clear of the detents in said detent wheel at the start of the indexing of the magazine.

3. The slide changer as claimed in claim 2 which further comprises an auxiliary detent lever adapted to engage a detent in said detent wheel while said detent lever has been raised by the engagement of said control pin by said cam lifting surface.

4. A slide changer comprising means to move slides stored in a magazine to and from a viewing position, indexing means including a gear adapted to mesh with a rack on the magazine and operatively coupled to the first said means to advance the magazine to present successive slides to said first said means, indexing control means comprising a detent wheel connected to said gear, a detent lever positioned to engage a detent in said detent wheel to arrest the movement of said detent wheel, and a movably mounted cam operatively connected to said means to move slides and positioned to slidably engage said detent lever to force said detent lever into the next consecutive detent on the detent wheel during the indexing of the magazine to limit the advance of the detent wheel to one detent.

5. A slide changer comprising a reciprocably mounted slide injection lever adapted to move slides stored in a slide magazine sequentially to and from a viewing position, an indexing gear carried by the slide changer adapted to mesh with a rack on the magazine, magazine positioning means operatively coupled to said indexing gear adapted to rotate it to thereby position said magazine, indexing means to advance the slide magazine to present successive slides to said injection lever and operatively connected to said injection lever comprising an actuator pivotally mounted on the slide changer and having a cam surface adjacent to the slide injection lever, an actuator engaging means on said slide injection lever positioned to engage the cam surface of the actuator to swing it about its pivotal mounting as the side injection lever withdraws slides from the viewing position and positioned to release said actuator thereafter, a pawl lever coupled to said actuator for movement therewith, a spring resisting the movement of said pawl lever by the actuator, a detent wheel coupled to said magazine engaging gear, a pawl on said pawl lever engaging said detent wheel and adapted to rotate it when said pawl lever and the interconnected actuator are moved by said spring whereby the indexing gear indexes the magazine, a detent lever releasably engaging the detents in said detent wheel, resilient means urging said detent lever against said detent wheel, a locking projection on said pawl lever adapted to force said detent lever in the next successive detent on the detent wheel during a portion only of the movement of the detent wheel by said pawl.

6. The slide changer as claimed in claim 5 which further comprises a cam lifting surface on said pawl lever positioned to lift said detent lever from said detent wheel when said actuator engaging means releases said actuator and pawl lever.

7. The slide changer as claimed in claim 5 which further comprises a resilient means positioned to cushion the terminal portion of the movement of said actuator and said pawl lever by said spring.

8. A slide changer comprising a reciprocably mounted slide injection lever adapted to move slides stored in a slide magazine sequentially to and from a viewing position, an indexing gear carried by the slide changer adapted to mesh with a rack on the magazine, magazine positioning means operatively coupled to said indexing gear adapted to rotate it to thereby position said magazine, indexing means to advance the slide magazine to present successive slides to said injection lever and operatively connected to said injection lever comprising an actuator pivotally mounted on the slide changer and having a cam surface adjacent to the slide injection lever, an actuator roller on said slide injection lever positioned to engage the cam surface of the actuator to swing it about its pivotal mounting as the slide injection lever withdraws slides from the viewing position and positioned to release said actuator thereafter, a pawl lever coupled to said actuator for movement therewith, a spring resisting the movement of said pawl lever by the actuator, a detent wheel coupled to said magazine engaging gear, a pawl on said pawl lever engaging said detent wheel and adapted to rotate it when said pawl lever and the interconnected actuator are released by said actuator roller and are moved by said spring whereby the indexing gear indexes the magazine, a detent lever releasably engaging the detents in said detent wheel, resilient means urging said detent lever against said detent wheel, a cam surface on said pawl lever having a locking projection and a control pin on said detent lever positioned to engage the same surface whereby the locking projection holds the detent lever in the next successive detent on the detent wheel during a portion only of the movement of the detent wheel by said pawl, and said locking projection positioned on said pawl lever to prevent movement of said actuator when said detent lever is positioned out of a detent thereby preventing movement of the slide injection lever when the magazine is improperly indexed.

References Cited in the file of this patent

UNITED STATES PATENTS

| | | |
|---|---|---|
| 998,305 | Roebuck | July 18, 1911 |
| 2,590,492 | Bennett et al. | Mar. 25, 1952 |
| 2,711,602 | Wiklund | June 28, 1955 |
| 2,756,630 | Goldberg | July 31, 1956 |
| 2,871,760 | Badalich | Feb. 3, 1959 |